(12) United States Patent
Fukuoka et al.

(10) Patent No.: US 7,658,817 B2
(45) Date of Patent: Feb. 9, 2010

(54) INDUSTRIAL EVAPORATION APPARATUS

(75) Inventors: Shinsuke Fukuoka, Tokyo (JP); Hiroshi Hachiya, Tokyo (JP); Kazuhiko Matsuzaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 356 days.

(21) Appl. No.: 11/666,464

(22) PCT Filed: Nov. 29, 2005

(86) PCT No.: PCT/JP2005/021860

§ 371 (c)(1),
(2), (4) Date: Apr. 27, 2007

(87) PCT Pub. No.: WO2006/064656

PCT Pub. Date: Jun. 22, 2006

(65) Prior Publication Data

US 2008/0289773 A1 Nov. 27, 2008

(30) Foreign Application Priority Data

Dec. 15, 2004 (JP) .............................. 2004-362739

(51) Int. Cl.
  *B01D 1/00* (2006.01)
  *B01D 1/30* (2006.01)
(52) U.S. Cl. ........................ 159/27.4; 159/43.1; 159/44; 159/DIG. 37
(58) Field of Classification Search ................ 159/27.4, 159/28.6, 43.1, 44, DIG. 37; 528/501, 502 R
See application file for complete search history.

(56) References Cited

U.S. PATENT DOCUMENTS

| | | | |
|---|---|---|---|
| 3,044,993 A | 7/1962 | Tiemersma | |
| 3,110,547 A | 11/1963 | Emmert | |
| 4,934,433 A * | 6/1990 | Aboul-Nasr | 159/43.1 |
| 5,453,158 A * | 9/1995 | Cummings et al. | 159/47.1 |
| 6,123,323 A * | 9/2000 | Yoneda et al. | 261/96 |
| 6,265,526 B1 | 7/2001 | Komiya et al. | |
| 6,429,276 B1 | 8/2002 | Komiya et al. | |
| 6,780,281 B1 | 8/2004 | Elsner et al. | |
| 7,041,780 B2 * | 5/2006 | Buckley et al. | 528/501 |

(Continued)

FOREIGN PATENT DOCUMENTS

DE         199 57 458         5/2001

(Continued)

OTHER PUBLICATIONS

"Chemical Engineers' Handbook," edited by the Society of Chemical Engineers, Japan, 1999 (pp. 403-405).

*Primary Examiner*—Virginia Manoharan
(74) *Attorney, Agent, or Firm*—Birch, Stewart, Kolasch & Birch, LLP (57) ABSTRACT

An industrial evaporation apparatus having a specified structure in which there are guides that do not themselves have a heat source, a flow path controlling member having a function of making the liquid fed onto a perforated plate from a liquid receiving port flow mainly from a peripheral portion toward a central portion of the perforated plate is provided in a liquid feeding zone, and formula (1) to (5), or formula (1) to (10), or formula (1) to (12), are satisfied.

13 Claims, 6 Drawing Sheets

U.S. PATENT DOCUMENTS

| | | |
|---|---|---|
| 7,235,158 B2 * | 6/2007 | Matsumoto et al. ............ 203/8 |
| 7,393,436 B2 * | 7/2008 | Eck et al. ...................... 203/1 |
| 7,520,964 B2 * | 4/2009 | Hammon et al. ............ 202/158 |
| 2002/0092625 A1 | 7/2002 | Kohlgruber et al. |

FOREIGN PATENT DOCUMENTS

| | | |
|---|---|---|
| EP | 1048685 | 11/2000 |
| JP | 30-2164 | 11/1949 |
| JP | 48-8355 | 2/1973 |
| JP | 53-17569 | 2/1978 |
| JP | 60-44527 A | 3/1985 |
| JP | 61-207429 A | 9/1986 |
| JP | 2-112301 U | 9/1990 |
| JP | 2004-516172 A | 6/2004 |
| WO | WO-96/09872 | 4/1996 |
| WO | WO-99/36457 A1 | 7/1999 |
| WO | WO-99/65970 A1 | 12/1999 |
| WO | WO-2005/063351 | 7/2005 |

* cited by examiner

INDUSTRIAL EVAPORATION APPARATUS

The instant application is the national phase of PCT International Application No. PCT/JP2005/021860 filed on Nov. 29, 2005 under 35 U.S.C. §371. The entire content of the above-identified application is hereby incorporated by reference.

TECHNICAL FIELD

The present invention relates to a novel industrial evaporation apparatus. More particularly, the present invention relates to an apparatus in which a liquid containing a material having a lower boiling point than that of the liquid is made to flow down along an external surface of a guide that does not themselves have a heat source, during which time the lower boiling point material is evaporated.

BACKGROUND ART

It is well-known that various industrial evaporation apparatuses are used to remove volatile components and/or low boiling point components by evaporation from a liquid and thus concentrating the liquid. For example, Kagaku Kogyo Binran ("Chemical Engineers' Handbook")$6^{th}$ Edition (edited by the Society of Chemical Engineers, Japan, 1999: Non-Patent Document 1) (see pages 403-405) describes the following types of industrial evaporation apparatuses: a submerged combustion type, a natural circulation immersed tube type, a natural circulation horizontal tube type, a vertical short tube type, a vertical long tube climbing film type, a horizontal tube falling film type, a vertical long tube falling film type, a forced circulation horizontal tube type, a forced circulation vertical tube type, coil type, an agitated film type, a centrifugal thin film type, a plate type, and a flash evaporation type. Of these industrial evaporation apparatuses, for a system in which the liquid is made to flow from the top downward, there are the horizontal tube falling film type, the vertical long tube falling film type, the forced circulation horizontal tube type, the forced circulation vertical tube type, and the agitated film type. With the exception of the agitated film type, all of these are of the same form as a multi-tube cylindrical heat exchanger. For the agitated film type, scrapers are rotated over a cylindrical or conical inner surface which is heated through an outer heat source, thus scraping a liquid film off from the heat transfer surface as the liquid film is formed thereon, whereby the liquid is concentrated through evaporation while making the evaporation uniform and promoting heat transfer. Moreover, with the horizontal tube falling film type or the forced circulation horizontal tube type, which are of the heat exchanger type, the liquid is concentrated through evaporation while being made to flow in the form of a liquid film over external surfaces of horizontally installed tubes; the tubes themselves are heated through a heating medium such as steam flowing therethrough.

In terms of the flow of the liquid, the industrial evaporation apparatuses closest to the type of the present invention are the vertical long tube falling film type and the forced circulation vertical tube type, but these are of a type in which the liquid is concentrated through evaporation while descending in the form of a film through vertically installed tubes, as opposed to the system of the present invention in which the liquid is made to flow down along external surfaces of guides, and moreover the tubes through which the liquid flows down are themselves heated by a heating medium that flows over the outside (trunk portion) of each of the tubes, unlike in the present invention in which the guides do not themselves have a heat source.

Moreover, strand evaporators in which a melt of a polymer or the like is extruded in the form of strands or filaments from a perforated plate into an evaporation zone, and the polymer melt is concentrated through evaporation while falling down freely are also known (See Patent Document 1: U.S. Pat. No. 3,110,547; Patent Document 2: Japanese Patent Publication No. 30-2164). However, there are drawbacks with such a strand evaporator, for example, because the liquid to be concentrated is allowed to fall down freely, the residence time in the evaporation zone is short, and hence the evaporating efficiency is poor, and moreover the strands or filaments sway sideways in the evaporation zone and are thus liable to fuse to one another, and hence continuous stable operation is difficult. Apparatuses in which a polyamide, a polyester or the like is produced while making a monomer mixture or prepolymer flow down along linear supports have also been proposed (See, for example, Patent Document 3: U.S. Pat. No. 3,044,993; Patent Document 4: Japanese Patent Publication No. 48-8355, Patent Document 5: Japanese Patent Application Laid-open No. 53-17569; Patent Document 6: Japanese Patent Application Laid-open No. 60-44527; Patent Document 7: Japanese Patent Application Laid-open No. 61-207429). Furthermore, an apparatus in which wire loops are installed in an evaporation zone, and a high-viscosity polymer melt is concentrated through evaporation or has gas removed therefrom while being made to flow down along the wire loops has been proposed, and it has been stated that such an apparatus can be advantageously used for subjecting a polycarbonate solution or melt in particular to concentration through evaporation or gas removal (See Patent Document 8: International Publication WO 2002/051606); this method is substantially the same as a method and apparatus already proposed by the present inventors in which a polycarbonate is produced by polymerizing a molten polymerization starting material while making the molten polymerization starting material flow down along wires or perforated sheet-shaped guides (See Patent Document 9: International Publication WO 99/36457). However, with such an apparatus having the wires or the perforated sheet-shaped guides, there have been no specific disclosures or suggestions relating to the scale or use of an apparatus which can carry out the evaporation operation stably for a prolonged period of time on an industrial scale such that not less than 1 ton/hr of the liquid is subjected to the evaporation.

Furthermore, with evaporation apparatuses known so far, there has been no description of means for avoiding degeneration such as discoloration, gelation, crosslinking, production of an ultra-high molecular weight, solidification, scorching or carbonization due to some of the liquid residing in the apparatus for a prolonged period of time. In particular, in the case of an apparatus for evaporating lower boiling point material from a liquid having a relatively high viscosity, it has been revealed for the first time through carrying out prolonged continuous operation that such degeneration occurs, then the degenerated material progressively or suddenly becomes mixed in the concentrated liquid, bringing about problems of discoloration and contamination with solid foreign material, which are fatal for the concentrated product such as polymer etc.

Figure 1:
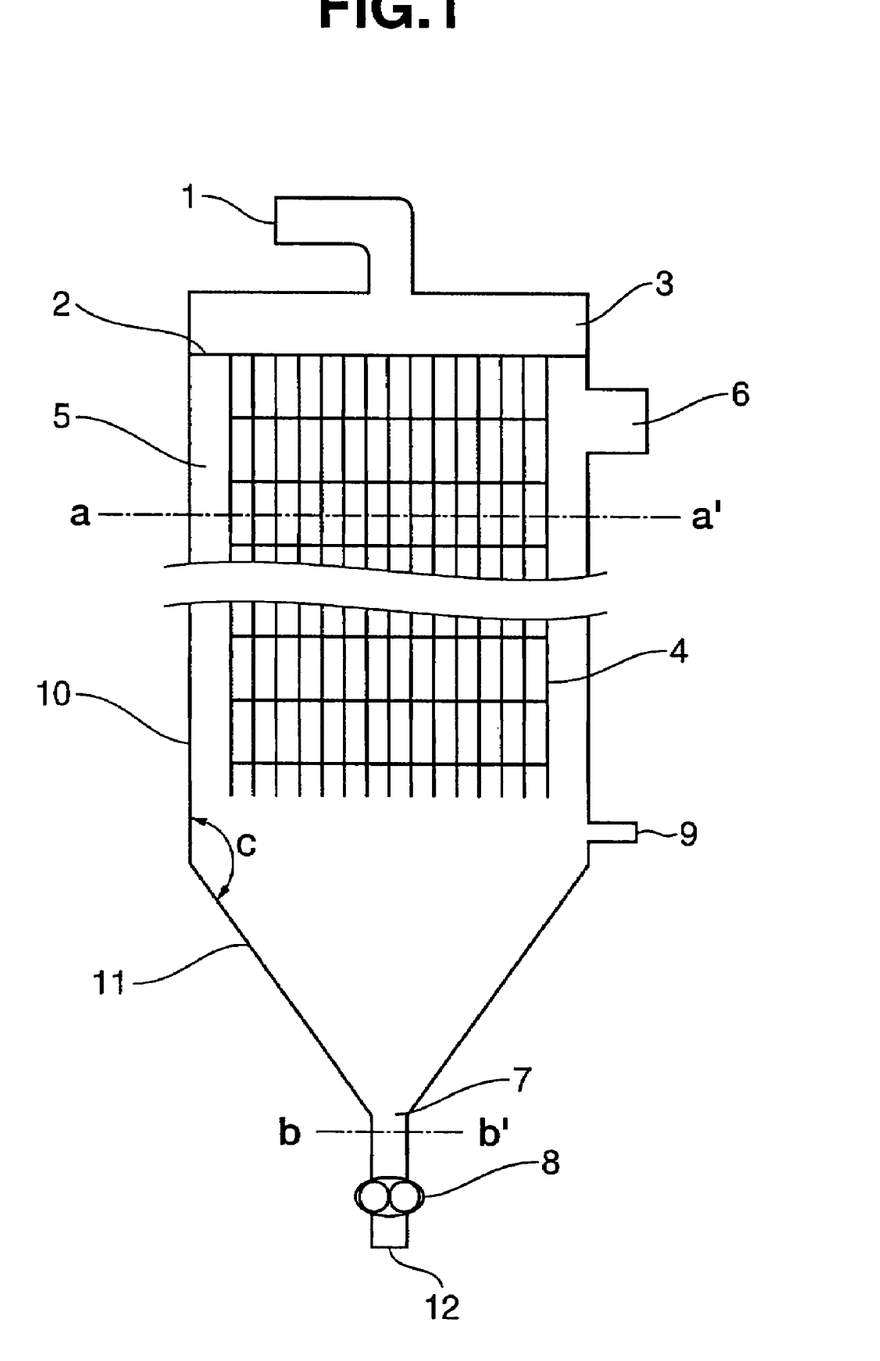
FIG. 1 is a schematic sectional view showing an industrial evaporation apparatus according to the present invention.

However, it is clear that with the evaporation apparatuses known so far, no consideration whatsoever has been given to such degeneration upon prolonged operation. For example, according to FIG. 1 in Patent Document 5, which relates to an evaporation apparatus that uses linear supports, it is clear that there is much so-called "dead space" where the polymer resides for a prolonged period of time and is thus heated between a hole portion of a perforated plate and an internal sidewall surface of a hollow body, and no means whatsoever has been adopted for reducing this "dead space". Accordingly, the high-viscosity material fed in from a high-viscosity material feeding port (7) resides for a prolonged period of time in the "dead space" between the perforated plate (3) and the internal sidewall surface of the hollow body, and hence the above problems occur inevitably. Moreover, even in recently proposed by Patent Document 8, no means whatsoever has been adopted for reducing "dead space" in a distributor pipe 3 (FIG. 2), or a feeding zone from which feeding is carried out onto a perforated plate (FIG. 3a).

DISCLOSURE OF INVENTION

It is an object of the present invention, in the case of an apparatus in which a liquid containing material having a lower boiling point than that of the liquid is made to flow down along an external surface of a guide that does not themselves have a heat source, during which time the lower boiling point material is evaporated, to provide a specific apparatus that can be operated stably for a prolonged period of time on an industrial scale such that not less than 1 ton/hr of the liquid is subjected to the evaporation, and furthermore to provide a specific industrial evaporation apparatus in which there are no problems due to degeneration caused by some of the liquid residing in the apparatus for a prolonged period of time.

The present inventors carried out studies into using in various applications a previously proposed guide-contacting downflow type polymerization apparatus in which a molten prepolymer is subjected to polymerization while being made to fall down along guides such as wires. As a result, the present inventors discovered an industrial evaporation apparatus having a specified structure characterized as described below in which the above object can be attained, thus reaching to the present invention. That is, the present invention provides:

1. An industrial evaporation apparatus in which a liquid containing a material having a lower boiling point than that of said liquid is made to flow down along an external surface of a guide that does not themselves have a heat source, during which time said lower boiling point material is evaporated, said evaporation apparatus comprises:

(1) said evaporation apparatus comprising a liquid receiving port; a liquid feeding zone for feeding said liquid via a perforated plate to said guide provided in an evaporation zone; said evaporation zone having a plurality of guides that extend downward within a space enclosed by said perforated plate, a side-wall casing, and a bottom-wall casing; an evaporated material outlet provided in said evaporation zone; and a liquid discharge port provided in a lowermost portion of the bottom-wall casing;

(2) a flow path controlling member which has a function of making said liquid fed onto the perforated plate from said liquid receiving port flow mainly from a peripheral portion toward a middle portion of the perforated plate being provided in said liquid feeding zone;

(3) an internal sectional area A (m$^2$) taken through a horizontal plane of the side-wall casing of said evaporation zone satisfying the following formula (1):

$$0.7 \leq A \leq 300 \tag{1};$$

(4) a ratio between said A (m$^2$) and an internal sectional area B (m$^2$) taken through a horizontal plane of the liquid discharge port satisfying the following formula (2):

$$20 \leq A/B \leq 1000 \tag{2};$$

(5) the bottom-wall casing constituting the bottom portion of said evaporation zone being connected at an internal angle C (°) to said side-wall casing on said bottom-wall casing, wherein said angle C (°) satisfies the following formula (3):

$$110 \leq C \leq 165 \tag{3};$$

(6) a length h (cm) of each of said guides satisfying the following formula (4):

$$150 \leq h \leq 5000 \tag{4};$$

(7) a total external surface area S (m$^2$) of said guides satisfying the following formula (5):

$$2 \leq S \leq 50000 \tag{5},$$

2. The industrial evaporation apparatus according to item 1, wherein not less than 1 ton/hr of said liquid is subjected to the evaporation, 3. The industrial evaporation apparatus according to item 1 or 2, wherein an angle E (°) between an internal sidewall surface of said liquid feeding zone and said perforated plate satisfies the following formula (6):

$$100 \leq E < 180 \tag{6},$$

4. The industrial evaporation apparatus according to any one of items 1 to 3, wherein said side-wall casing of said evaporation zone is cylindrical with an inside diameter D (cm) and a length L (cm), the bottom-wall casing connected at a bottom portion of said side-wall casing is conical, and the liquid discharge port, which is in the lowermost portion of the conical bottom-wall casing, is cylindrical with an inside diameter d (cm), wherein D, L and d satisfy the following formulae (7), (8), (9) and (10):

$$100 \leq D \leq 1800 \tag{7}$$

$$5 \leq D/d \leq 50 \tag{8}$$

$$0.5 \leq L/D \leq 30 \tag{9}$$

$$h - 20 \leq L \leq h + 300 \tag{10},$$

5. The industrial evaporation apparatus according to any one of items 1 to 4, wherein the h satisfies the following formula (11):

$$400 < h \leq 2500 \tag{11},$$

6. The industrial evaporation apparatus according to any one of items 1 to 5, wherein one of said guides is cylindrical, or pipe-shaped and made to be such that the liquid and/or gaseous material cannot enter therein, with an outside diameter r (cm), wherein r satisfies the following formula (12):

$$0.1 \leq r \leq 1 \tag{12},$$

7. The industrial evaporation apparatus according to any one of items 1 to 5, wherein said guides comprise guides according to item 6, and the guides are joined together by transverse supports, 8. The industrial evaporation apparatus according to any one of items 1 to 5, wherein said guides comprise guides according to item 6, and form one of a grid-like or mesh-like guide structure in which the guides are fixed together by transverse supports, a three-dimensional guide structure in which a plurality of grid-like or mesh-like guide structures are arranged in front of and behind one another and are fixed together by transverse supports, and a jungle-gym-like three-dimensional guide structure in which the guides are fixed together in front of and behind, and left and right of, one another by transverse supports, 9. The industrial evaporation apparatus according to any one of items 1 to 8, wherein said liquid is a melt of a monomer or a mixture of two or more kinds of monomers for producing a condensation polymer, and/or a prepolymer of the condensation polymer, and/or the condensation polymer, the lower boiling point material is a by-produced material and/or oligomer produced through condensation polymerization, and said industrial evaporation apparatus is a condensation polymer polymerization apparatus for removing said lower boiling point material from said melt by evaporation so as to increase a polymerization degree of the prepolymer of the condensation polymer and/or the condensation polymer, 10. The industrial evaporation apparatus according to item 9, wherein the condensation polymer is a polyester, a polyamide, or a polycarbonate, 11. The industrial evaporation apparatus according to any one of items 1 to 8, wherein said liquid is a melt of a thermoplastic polymer A, said lower boiling point material is a monomer, an oligomer, and a by-produced material contained in the polymer, and the industrial evaporation apparatus is a purifying apparatus for removing said lower boiling point material from said melt by evaporation so as to increase purity of said thermoplastic polymer A, 12. The industrial evaporation apparatus according to item 11, wherein said thermoplastic polymer A is a polystyrene-based polymer, a polyvinyl chloride-based polymer, a polyvinylidene chloride-based polymer, a polyacrylonitrile-based polymer, a polyacrylic ester-based polymer, a polymethacrylic ester-based polymer, or a thermoplastic elastomer, 13. The industrial evaporation apparatus according to any one of items 1 to 8, wherein said liquid is a solution of a thermoplastic polymer B, said lower boiling point material is a solvent in which said thermoplastic polymer is dissolved and/or a monomer, an oligomer, and a by-produced material contained in said polymer solution, and said industrial evaporation apparatus is a separation recovery/purification apparatus for removing said low boiling point material from said solution by evaporation so as to separate and thus recover said thermoplastic polymer from said solution and increase purity of said thermoplastic polymer.

ADVANTAGEOUS EFFECTS OF THE INVENTION

The industrial evaporation apparatus according to the present invention is an evaporation/concentration apparatus in which a large amount of a liquid can be efficiently concentrated through evaporation stably for a prolonged period of time, and in which not less than 1 ton/hr of the concentrated liquid can be produced, without occurring degeneration of the liquid over a prolonged period of time. In particular, the industrial evaporation apparatus according to the present invention achieves excellent effects in the concentration through evaporation of a liquid having a relatively high viscosity. With the apparatuses known so far for concentrating such liquids having the relatively high viscosity through evaporation, there have been places where some of the liquid resides while being heated for a prolonged period of time, whereupon this liquid undergoes degeneration such as discoloration, gelation, crosslinking, production of an ultra-high molecular weight, solidification, scorching, carbonization or the like, and it has been found that the degenerated material mixes in the concentrated liquid progressively or suddenly, causing a deterioration in color and properties of the concentrated liquid. The industrial evaporation apparatus according to the present invention is a continuous evaporation apparatus that does not suffer from such drawbacks, and in particular achieves excellent effects as a polymerization apparatus for a condensation polymer, a purifying apparatus for a thermoplastic polymer, or an apparatus for separating and thus recovering the polymer from a thermoplastic polymer solution and purifying the polymer. That is, the industrial evaporation apparatus according to the present invention is an apparatus that enables a high-performance and high-purity polymer to be produced with high productivity of not less than 1 ton/hr stably for a prolonged period of time with no discoloration or contamination with foreign material caused by production of thermally degenerated material. Furthermore, in the case that the evaporation apparatus according to the present invention is used as a polymerization apparatus, it can be made to be such that there is very little variation in molecular weight.

1: liquid receiving port, 2: perforated plate, 3: liquid feeding zone, 4: guide, 5: evaporation zone, 6: evaporated material outlet, 7: liquid discharge port, 8: liquid discharge pump, 9: an inert gas feeding port according to need, 10: side-wall casing of evaporation zone, 11: bottom-wall casing of evaporation zone, 20: liquid outlet, 13: flow path controlling member, 21: example of hole of perforated plate, 22: inner sidewall surface of liquid feeding zone, 23: upper inner wall surface.

BEST MODE FOR CARRYING OUT THE INVENTION

The present invention is based on the discovery that to attain the above object for a continuous type evaporation apparatus, various conditions must be satisfied. The present invention will now be described in more detail with reference to sectional views (FIGS. 1 and 2) illustrating the concept of the evaporation apparatus according to the present invention and sectional views (FIGS. 3 and 4) showing a part of the evaporation apparatus.

A liquid receiving port 1 is preferably provided in a top of a liquid feeding zone 3. There may be such a liquid receiving port 1 in one place or in a plurality of places, the at least one liquid receiving port 1 preferably being disposed such that the liquid in the liquid feeding zone 3 can be fed onto a perforated plate 2 as uniformly as possible. In the case that there is a liquid receiving port 1 in only one place, the liquid receiving port 1 is preferably provided in a central portion of the top of the liquid feeding zone 3. A flow path controlling member 20 having a function of making the liquid fed onto the perforated plate 2 from the liquid receiving port 1 flow mainly from a peripheral portion toward a central portion of the perforated plate 2 must be provided in the liquid feeding zone 3. The flow path controlling member 20 has an effect of making the liquid flow from the peripheral portion toward the central portion of the perforated plate 2, thus preventing the liquid from residing for a prolonged period of time in a space between holes (e.g. 21) in the perforated plate 2 and an internal sidewall surface 22 of the liquid feeding zone 3. The liquid made to flow mainly from the peripheral portion toward the central portion of the perforated plate 2 is thus fed onto guides 4 from the holes arranged between the peripheral portion and the central portion of the perforated plate 2.

The flow path controlling member 20 may have any shape so long as the effects of the flow path controlling member 20 can be achieved, but the outline of a cross section of the flow path controlling member 20 is preferably similar figure to the outline of a cross section of the perforated plate 2. As used herein, the term "the cross section of the flow path controlling member 20" refers to a section obtained by cutting through the flow path controlling member 20 in a transverse direction at the place where this section exhibits the maximum area. A preferable range for the spacing between the flow path controlling member 20 and the internal sidewall surface 22 of the liquid feeding zone 3 varies according to the amount and viscosity of the liquid to be processed and so on, but in the case the that the evaporation apparatus is used as a polymerization apparatus, a polymer purifying apparatus or the like with the liquid to be subjected to the evaporation having a relatively high viscosity, a range of from 1 to 50 cm is generally preferable, with from 2 to 30 cm being more preferable, and from 3 to 20 cm being yet more preferable. The spacing between a top internal wall surface 23 of the liquid feeding zone 3 and the flow path controlling member 20 may be any spacing, but is preferably made to be such that the residence time of the liquid in the liquid feeding zone 3 is as short as possible.

For this reason, this spacing is generally in a range of from 1 to 200 cm, preferably from 2 to 170 cm, more preferably from 3 to 150 cm. The flow path controlling member 20 can be made to be such that the spacing between the top internal wall surface 23 of the liquid feeding zone 3 and the flow path controlling member 20 is substantially the same from the liquid receiving port 1 to the internal side wall surface 22 of the liquid feeding zone 3, but can also be made to be such that this spacing gradually narrows, or conversely gradually widens. Moreover, the spacing between the flow path controlling member 20 and the perforated plate 2 is generally from 1 to 50 cm, preferably from 2 to 30 cm, more preferably from 3 to 20 cm. The flow path controlling member 20 can be made to be such that the spacing between the perforated plate 2 and the flow path controlling member 20 is substantially the same from the internal side wall surface 22 of the liquid feeding zone 3 to the central portion of the perforated plate 2, or can also be made to be such that this spacing gradually narrows, or conversely gradually widens, but is preferably made to be such that the spacing is substantially the same, or gradually narrows.

The flow path controlling member 20 obstructs the liquid fed in from the liquid receiving port 1 from being led directly to the holes in the perforated plate 2, and hence may also be thought of as being a kind of baffle. Note that in the case that the perforated plate 2 has a large area, it is also preferable for some of the liquid fed in to be made to take a short cut to the vicinity of the central portion of the perforated plate 2 without passing the peripheral portion of the perforated plate 2, in which case it is preferable to provide a hole in one place or a plurality of places in the vicinity of a central portion of the flow path controlling member 20 or another suitable portion for this purpose. So that "dead space" is not created in the liquid feeding zone 3, it is also preferable for the angle E (°) between the internal sidewall surface 22 of the liquid feeding zone 3 and the perforated plate 2 to satisfy the following formula (6):

$$100 \leq E < 180 \tag{6}$$

Here, in the case that the internal sidewall surface 22 is planar, E is an angle between the internal sidewall surface 22 and the perforated plate 2 in a section taken through a plane perpendicular to both the plane of the internal sidewall surface 22 and an upper surface of the perforated plate 2. Alternatively, in the case that the internal sidewall surface 22 is a concave curved surface, E is an angle between the upper surface of the perforated plate 2 and a tangent to the internal sidewall surface 22 at the point where the internal sidewall surface 22 starts to rise up in a section taken through a plane perpendicular to both the concave surface of the internal sidewall surface 22 and the upper surface of the perforated plate 2. Moreover, it is also preferable to devise the evaporation apparatus such that the vicinity of the joint between the top internal wall surface 23 and the internal sidewall surface 22 of the liquid feeding zone 3 does not become "dead space". It is preferable to make an angle between the top internal wall surface 23 and the internal sidewall surface 22 be greater than 90°, or 90° or close thereto, since in this case the vicinity of the joint is concave and hence liquid does not stagnate here.

The internal sectional area A ($m^2$) taken through a horizontal plane (plane a-a') of a side-wall casing 10 of an evaporation zone 5 must satisfy the following formula (1):

$$0.7 \leq A \leq 300 \tag{1}$$

Furthermore, a ratio between A ($m^2$) and the internal sectional area B ($m^2$) taken through a horizontal plane (plane b-b') of a liquid discharge port 7 must satisfy the following formula (2):

$$20 \leq A/B \leq 1000 \tag{2}$$

A/B must satisfy the above formula (2) so that the liquid and polymer that have been concentrated through evaporation, or the melt whose viscosity has been increased without bringing about a reduction in the quality of the concentrated liquid can be discharged.

Furthermore, a bottom-wall casing 11 constituting a bottom portion of the evaporation zone 5 is connected at an internal angle C (°) to the side-wall casing 10 thereabove, and the angle C (°) must satisfy the following formula (3):

$$110 \leq C \leq 165 \tag{3}$$

To keep down the equipment cost, C is preferably as close as possible to 90°, but to move the concentrated liquid falling down from the lower ends of the guides 4, and the melt whose viscosity has been increased without bringing about a reduction in the quality of the concentrated liquid, to the liquid discharge port 7, C must satisfy the above formula (3).

Furthermore, the length h (cm) of each of the guides 4 must satisfy the following formula (4):

$$150 \leq h \leq 5000 \tag{4}$$

It is undesirable for h to be shorter than 150 cm, since then the concentration or polymerization cannot be carried out sufficiently. It is undesirable for h to be longer than 5000 cm, since then the difference in the viscosity of the liquid between the top and the bottom of each guide 4 becomes too great, thereby resulting in tending to be much variation in the concentration degree or polymerization degree.

Furthermore, the total external surface area S (m$^2$) of the guides 4 must satisfy the following formula (5):

$$2 \leq S \leq 50000 \quad (5).$$

If S is less than 2 m$^2$, then the desired amount of the liquid subjected to the evaporation of not less than 1 ton/hr or the desired production amount of the polymer produced cannot be attained. Moreover, to attain such a production amount while keeping down the equipment cost, and to eliminate variation in properties, S must be made to be not more than 50000 m$^2$.

It has been discovered that the evaporation apparatus according to the present invention satisfying the above various conditions not only solves the problems of the evaporation apparatuses known so far, but moreover, surprisingly, achieves excellent effects as described earlier, it being possible to produce a high-quality and high-performance concentrated liquid or polymer with no discoloration in an amount of not less than 1 ton/hr stably for a prolonged period of time of not less than several thousand hours, for example not less than 5,000 hours.

It is supposed that the reason why the industrial evaporation apparatus according to the present invention exhibits such excellent effects is that, in addition to the various reasons described above, a combined effect arises when the above conditions are combined. For example, it is supposed that this is because guides 4 having a high surface area satisfying the formulae (4) and (5) are very effective for efficient internal stirring and surface renewal of a large amount of liquid or prepolymer or polymer fed in at a relatively low temperature, and hence evaporation of the lower boiling point material can be carried out efficiently, which is useful for obtaining a large amount of not less than 1 ton/hr of high-quality concentrated liquid or polymer, and moreover the angle C satisfying the formula (3) makes it possible to shorten the time taken for the large amount of the high-quality concentrated liquid or polymer falling down from the guides 4 to be discharged from the discharge port 7, and thus reduce the heat history.

Note that the performance of the evaporation apparatus on an industrial scale can only be established through prolonged operation using large-scale production equipment, and it goes without saying that the cost of the production equipment here is an important factor that must be taken into consideration. Another advantageous effect of the present invention is that the equipment cost-to-performance ratio for the evaporation apparatus according to the present invention can be made lower than with the conventional evaporation apparatuses or polymerization apparatuses.

Specified conditions and required ranges for dimensions, angles and so on for the industrial evaporation apparatus according to the present invention have been described above, but more preferable ranges are as follows: A more preferable range for the internal sectional area A (m$^2$) taken through a horizontal plane of the side-wall casing 10 of the evaporation zone 5 is $0.8 \leq A \leq 250$, with $1 \leq A \leq 200$ being yet more preferable.

Moreover, a more preferable range for the ratio between A (m$^2$) and the internal sectional area B (m$^2$) taken through a horizontal plane of the liquid discharge port 7 is $25 \leq A/B \leq 900$, with $30 \leq A/B \leq 800$ being yet more preferable.

Moreover, a more preferable range for the internal angle C (°) of the bottom-wall casing 11 constituting the bottom portion of the evaporation zone 5 to the side-wall casing 10 thereabove is $120 \leq C \leq 165$, with $135 \leq C \leq 165$ being yet more preferable. Note that in the case of progressively increasing the concentration degree or polymerization degree using a plurality of evaporation apparatuses, taking the angles for the evaporation apparatuses to be C1, C2, C3 . . . respectively, it is preferable to make $C1 \leq C2 \leq C3 \leq \ldots$.

Moreover, the required length h (cm) of each of the guides 4 varies with factors such as the amount, viscosity and temperature of the liquid to be processed, the amount and boiling point of lower boiling point material, the pressure and temperature in the evaporation zone, and the required concentration degree or polymerization degree, but a more preferable range is $200 \leq h \leq 3000$, with $400 < h \leq 2500$ being yet more preferable. Moreover, the required total external surface area S (m$^2$) of the guides 4 also varies with factors such as the above, but a more preferable range is $10 \leq S \leq 40000$, with $15 \leq S \leq 30000$ being yet more preferable. The term "total external surface area of the guides" used in the present invention means the total surface area of the guides with which the liquid contacts when flowing down; for example, in the case of a guide such as a pipe, this means the surface area of the outside of the pipe, the surface area of the inside surface of the pipe over which the liquid does not flow down not being included.

In the industrial evaporation apparatus according to the present invention, the shape of the inside section taken through a horizontal plane of the side-wall casing 10 of the evaporation zone 5 may be any shape, for example polygonal, elliptical or circular. Operation is generally carried out with the evaporation zone 5 under a reduced pressure, and hence any shape is acceptable so long as this reduced pressure can be withstood, but a circular shape or a shape close thereto is preferable. The side-wall casing 10 of the evaporation zone 5 is thus preferably cylindrical. In this case, it is preferable for a conical bottom-wall casing to be provided at the bottom of the cylindrical side-wall casing 10, with a cylindrical liquid discharge port 7 being provided in the lowermost portion of the bottom-wall cashing.

In the industrial evaporation apparatus according to the present invention, in the case that each of the side-wall and bottom-wall casings of the evaporation zone 5 comprises a cylindrical portion and a conical portion as described above, and the liquid discharge port 7 for the concentrated liquid or polymer is cylindrical, taking the cylindrical portion of the side-wall casing to have an inside diameter D (cm) and a length L (cm), and taking the liquid discharge port 7 to have an inside diameter d (cm), D, L and d preferably satisfy the following formulae (7), (8), (9) and (10):

$$100 \leq D \leq 1800 \quad (7)$$

$$5 \leq D/d \leq 50 \quad (8)$$

$$0.5 \leq L/D \leq 30 \quad (9)$$

$$h - 20 \leq L \leq h + 300 \quad (10).$$

For the evaporation apparatus according to the present invention, a more preferable range for D (cm) is $150 \leq D \leq 1500$, with $200 \leq D \leq 1200$ being yet more preferable. Moreover, a more preferable range for D/d is $6 \leq D/d \leq 45$, with $7 \leq D/d \leq 40$ being yet more preferable. Moreover, a more preferable range for L/D is $0.6 \leq L/D \leq 25$, with $0.7 \leq L/D \leq 20$ being yet more preferable. Moreover, a more preferable range for L (cm) is $h - 10 \leq L \leq h + 250$, with h≦L≦h+200 being yet more preferable. If D, d and L do not simultaneously satisfy all of the above relationships, then it becomes difficult to attain the object of the present invention.

The precise reason why the evaporation apparatus according to present invention enables production of a high-quality and high-performance concentrated liquid or polymer having excellent mechanical properties with no discoloration stably (in the case of producing a polymer, with very little variation in molecular weight etc.) for a prolonged period of time on an industrial scale with a fast evaporation rate or polymerization rate is not clear, but is thought to be as follows: That is, according to the evaporation apparatus of the present invention, the starting material liquid is led from the liquid receiving port 1 via the liquid feeding zone 3 and the perforated plate 2 to the guides 4, and is then concentrated, or has the polymerization degree thereof increased, while flowing down along the guides 4. Effective internal stirring and surface renewal of the liquid or molten prepolymer occur naturally as the liquid or molten prepolymer flows down along the guides, and thus removal of lower boiling point material is carried out effectively, whereby the concentration or polymerization proceeds at a fast rate. The viscosity increases as the concentration or polymerization proceeds, and hence the adhesion force of the liquid or melt to the guides 4 increases, and thus the amount of the liquid or melt adhered to each guide increases toward the bottom of the guide. This means that the residence time of the liquid or molten prepolymer on the guide, i.e. the evaporation time or polymerization reaction time, increases. Moreover, for the liquid or molten prepolymer, which flows down under its own weight while being supported on the guide, the surface area per unit weight is very high, and hence surface renewal is carried out efficiently. Concentration through evaporation, or increase of molecular weight in the latter half of polymerization, can thus be attained in a high viscosity region easily, whereas this has been impossible with the conventional evaporation apparatuses or mechanical agitation type polymerization apparatuses. This is one of the excellent characteristic features of the evaporation apparatus according to the present invention.

The only reason that the amount of the liquid or melt adhered to the guides increases in the latter half of the polymerization or the evaporation is because of the increasing of the adhesive holding force, which corresponds to the increasing of viscosity, and hence approximately the same amount of the liquid or melt having approximately the same viscosity is supported at the same height on each of the plurality of guides. On the other hand, the liquid or melt is continuously fed onto the guides from the top thereof, and hence liquid having approximately the same viscosity, or melt of increased polymerization degree having approximately the same melt viscosity, continuously falls down into the bottom portion of the casing from the lower ends of the guides. That is, liquid of approximately the same viscosity, or polymer of approximately the same polymerization degree, produced while flowing down the guides collects in the bottom portion of the bottom-wall casing 11, and hence a concentrated liquid with very little variation in evaporation degree, or a polymer with very little variation in molecular weight, is continuously produced. This is another one of the excellent characteristic features of the evaporation apparatus according to the present invention. The concentrated liquid or polymer collected in the bottom portion of the bottom-wall casing is continuously withdrawn through the liquid discharge port 7 by a discharging pump 8, and in the case of a polymer, is continuously pelletized via an ordinary extruder or the like. In this case, additives and so on may be added in the extruder.

The perforated plate 2 in the evaporation apparatus according to the present invention is generally selected from flat plates, corrugated plates, and plates that are thickened in a central portion thereof; the shape of the cross section of the perforated plate 2 is generally selected from shapes such as circular, oval, triangular, and polygonal. The shape of the cross section of each of the holes in the perforated plate is generally selected from shapes such as circular, oval, triangular, slit-shaped, polygonal, and star-shaped. The sectional area of the holes is generally in a range of from 0.01 to 100 $cm^2$, preferably from 0.05 to 10 $cm^2$, particularly preferably from 0.1 to 5 $cm^2$. The spacing between holes, specifically the distance between hole centers, is generally from 1 to 500 mm, preferably from 25 to 100 mm. The holes in the perforated plate may be holes that penetrate through the perforated plate, or alternatively pipes may be provided in the perforated plate. Moreover, the holes may be tapered.

The guides in the evaporation apparatus according to the present invention do not themselves have a heat source such as a heating medium or an electrical heater therein, and each of the guides is a member for which a ratio of the length in a direction perpendicular to a horizontal section relative to the average length of the outer periphery of such a horizontal section is very high. This ratio is generally in a range of from 10 to 1,000,000, preferably from 50 to 100,000. The shape of the horizontal section is generally selected from shapes such as circular, oval, triangular, square, polygonal, and star-shaped. The shape of this section may be constant, or may vary, in the length direction. Moreover, each of the guides may be hollow. A significantly characteristic feature of the present invention is that because the guides do not themselves have a heat source, there is absolutely no risk of thermal degeneration of the liquid on the surface of the guides.

Each of the guides may be a single wire, a single thin rod, a single thin pipe made to be such that the liquid or the molten prepolymer cannot enter thereinto, or the like, or a plurality of such guides may be combined using a method such as twisting together. Moreover, the guides may form a mesh-like structure, or a punching plate-like structure. The surface of each guide may be smooth, or may be uneven, and may have projections or the like in places. Preferable guides are cylindrical ones such as wires or thin rods, thin pipes as described above, mesh-like guide structures, and punching plate-like guide structures.

In the guide-contacting downflow type evaporation apparatus according to the present invention, which enables production of a high-quality concentrated liquid or polymer on an industrial scale (in terms of production amount, prolonged stable production, etc.), a particularly preferable guide structure is one of a type in which a plurality of guides each having the form of a wire or a thin rod or a thin pipe as described above are joined together at suitable vertical intervals using transverse supports from the top to the bottom of the guides. Examples are mesh-like guide structures in which a plurality of guides each having the form of a wire or a thin rod or a thin pipe as described above are fixed together using transverse supports from the top to the bottom of the guides at suitable vertical intervals, for example intervals of from 1 to 200 cm, a three-dimensional guide structure in which a plurality of such mesh-like guide structures are arranged in front of and behind one another and joined together using transverse supports at suitable vertical intervals, for example intervals of from 1 to 200 cm, or a jungle-gym-like three-dimensional guide structure in which a plurality of guides each having the form of a wire or a thin rod or a thin pipe as described above are fixed together in front of and behind, and left and right of, one another using transverse supports at suitable vertical intervals, for example intervals of from 1 to 200 cm. The transverse supports are not only useful for keeping the intervals between the guides approximately constant, but are also useful for increasing the overall strength of flat or curved guides, or guides forming a three-dimensional structure. The supports may be of the same material as the guides, or a different material.

In the present invention, in the case that each guide is cylindrical, or has the form of a pipe made to be such that the liquid or molten prepolymer cannot enter thereinto, with an outside diameter r (cm), r preferably satisfies the formula (12):

$$0.1 \leq r \leq 1 \tag{12}$$

The guides in the present invention promote concentration through evaporation or polymerization of the liquid or molten prepolymer as the liquid or molten prepolymer flows down the guides, and also have a function of holding the liquid or molten prepolymer for a certain period of time. This holding time is related to the evaporation time or polymerization reaction time. As described above, as the evaporation or polymerization proceeds, the viscosity of the liquid or melt progressively increases, and hence the holding time and the amount held progressively increase. For a given melt viscosity, the amount of the liquid or molten prepolymer held by the guides varies with the external surface area of the guides, i.e. in the case of cylindrical or pipe-shaped guides, with the outside diameter.

Moreover, the guides provided in the evaporation apparatus according to the present invention must be strong enough to support their own weight plus the weight of the liquid or molten prepolymer or polymer being held. For this reason, the thickness of the guides is important, and in the case of cylindrical or pipe-shaped guides, the formula (12) is preferably satisfied. If r is less than 0.1, then prolonged stable operation becomes difficult in terms of the strength, whereas if r is greater than 1, then the guides themselves become very heavy, and hence there are problems such as having to make the perforated plate very thick so as to hold the guides in the evaporation apparatus. Moreover, there is an increase in parts where the amount of the liquid or molten prepolymer or polymer held is too high, resulting in problems such as variation in the concentration degree or the molecular weight increasing. For such reasons, a more preferable range for r is $0.15 \leq r \leq 0.8$, with $0.2 \leq r \leq 0.6$ being yet more preferable.

A preferable material for the guides is one selected from metals such as stainless steel, carbon steel, hastelloy, nickel, titanium, chromium, aluminum, and other alloys, highly heat-resistant polymeric materials, and so on. Stainless steel is particularly preferable. Moreover, the surfaces of the guides may be subjected to any of various treatments as necessary such as plating, lining, passivation treatment, acid washing, or washing with a solvent, phenol or the like.

There are no particular limitations on the positional relationship between the guides and the perforated plate or the positional relationship between the guides and the holes in the perforated plate so long as the liquid or starting material molten prepolymer or polymer can contact the guides and flow down the guides. The guides and the perforated plate may be in contact with one another, or not in contact with one another. Although there is no such limitation, it is preferable to provide the guides in correspondence with the holes in the perforated plate. The reason for this is that design may then be carried out such that the liquid or starting material molten prepolymer or polymer falling down from the perforated plate contacts the guides in suitable positions.

Specific preferable examples of providing the guides in correspondence with the holes in the perforated plate include: (1) a method in which the upper end of each guide is fixed to the underside of the flow path controlling member or the like, and the guides are provided such that each guide penetrates through the vicinity of a central portion of a hole in the perforated plate; (2) a method in which the upper end of each guide is fixed to a peripheral portion at an upper end of a hole in the perforated plate, and the guides are provided such that each guide penetrates through a hole in the perforated plate; and (3) a method in which the upper end of each guide is fixed to the underside of the perforated plate.

Examples of methods for making the liquid or starting material molten prepolymer or polymer pass through the perforated plate and flow down along the guides are a method in which the liquid or starting material molten prepolymer or polymer is allowed to flow down through its own weight or the liquid head, and a method in which the liquid or starting material molten prepolymer or polymer has pressure applied thereto using a pump or the like and is thus extruded from the perforated plate. A preferable method is one in which a prescribed amount of the liquid or starting material molten prepolymer or polymer is fed into the liquid feeding zone of the evaporation apparatus under pressure using a feed pump, and then the liquid or starting material molten prepolymer or polymer thus led onto the guides via the perforated plate flows down along the guides under its own weight.

The evaporation apparatus according to the present invention is an apparatus for evaporating lower boiling point material from a liquid containing this lower boiling point material, i.e. containing material having a lower boiling point than that of the liquid. The liquid may be any liquid. The liquid may be at room temperature, but is generally fed into the evaporation apparatus from the liquid receiving port in a heated state. Moreover, it is generally preferable for a jacket or the like to be provided on an outer wall of the evaporation apparatus. If necessary, heating is then carried out by passing steam, a heating medium or the like through the jacket, thus heating or maintaining the temperature of the liquid feeding zone, the flow path controlling member, the perforated plate, or the evaporation zone.

The evaporation apparatus according to the present invention is not only used as an apparatus for concentrating a liquid, but also is particularly preferably used as an evaporation apparatus for a liquid having a relatively high viscosity, for example as a polymerization apparatus for a condensation polymer, a purifying apparatus for a thermoplastic polymer containing low boiling point material such as monomer, oligomer and by-produced material, or an apparatus for separating and thus recovering the polymer from a thermoplastic polymer solution.

It is thus preferable to use the industrial evaporation apparatus according to the present invention as a polymerization apparatus for a condensation polymer, in the case that the liquid is a melt of a monomer or a mixture of a plurality of monomers for producing a condensation polymer, and/or a prepolymer of the condensation polymer, and/or the condensation polymer, and the low boiling point material comprises a by-produced material and/or an oligomer produced through the condensation polymerization, for removing the low boiling point material from the melt by evaporation so as to increase the polymerization degree of the prepolymer of the condensation polymer and/or the condensation polymer. Preferable examples of the condensation polymer include polyesters such as aromatic-aliphatic polyesters such as polyethylene terephthalate, polytrimethylene terephthalate and polybutylene terephthalate, and various copolyesters, polyesters of hydroxycarboxylic acids such as glycolic acid and lactic acid, and various copolyesters, aliphatic-aliphatic polyesters between an aliphatic diol and an aliphatic dicarboxylic acid, and various copolyesters, and aromatic-aromatic polyesters such as polyarylates and liquid crystal polyesters, and various copolyesters; polyamides such as aliphatic polyamides such as nylon 6, nylon 66, nylon 612 and nylon 12, and various copolyamides, and aliphatic-aromatic polyamides such as nylon 6T, and various copolyamides; polycarbonates such as aliphatic polycarbonates, aromatic polycarbonates, and various copolycarbonates; and polyester polycarbonates. By using the evaporation apparatus according to the present invention, a high-purity and high-performance condensation polymer can be produced stably for a prolonged period of time with no discoloration or gelated material or solid foreign material, and with very little variation in molecular weight.

Alternatively, it is also preferable to use the industrial evaporation apparatus according to the present invention, in the case that the liquid is a melt of a thermoplastic polymer A, and the lower boiling point material comprises a monomer, an oligomer, a by-produced material and so on contained in the polymer, as a purifying apparatus for removing the lower boiling point material from the melt by evaporation so as to increase the purity of the polymer. Preferable examples of the thermoplastic polymer A include polystyrene-based polymers such as polystyrene, high impact polystyrene (HIPS), and various copolymers; polyvinyl chloride-based polymers such as polyvinyl chloride, and various copolymers; polyvinylidene chloride-based polymers such as polyvinylidene chloride, and various copolymers; acrylonitrile-based polymers such as AS resins, ABS resins, and various copolymers; polyolefins such as polypropylene; polyacrylic ester-based polymers; polymethacrylic ester-based polymers such as PMMA, and various copolymers; and thermoplastic elastomers. According to the evaporation apparatus of the present invention, impurities such as residual monomers contained in the thermoplastic polymer A can be removed efficiently at a relatively low temperature, and hence a high-purity and high-performance thermoplastic polymer A can be obtained with no thermal decomposition and no discoloration.

Alternatively, it is also preferable to use the industrial evaporation apparatus according to the present invention, in the case that the liquid is a solution of a thermoplastic polymer B, and the lower boiling point material comprises a solvent in which the thermoplastic polymer is dissolved and/or a monomer, an oligomer, a by-produced material and so on contained in the polymer solution, as a separation recovery/purification apparatus for removing the lower boiling point material from the solution by evaporation so as to separate and thus recover the thermoplastic polymer from the solution and increase the purity of the thermoplastic polymer. A preferable example of the solution of the thermoplastic polymer B is a solution of a polymer such as SBR, BR or EPDM produced through solution polymerization using a solution of an aromatic polycarbonate in a chlorinated solvent (e.g. methylene chloride, chlorobenzene), a solvent (e.g. toluene, hexane), etc. Moreover, it is also preferable to remove the solvent and so on from an aromatic polycarbonate melt remaining a chlorinated solvent or an elastomer remaining a polymerization solvent. According to the evaporation apparatus of the present invention, the solvent and impurities can be removed efficiently at a relatively low temperature, and hence a high-purity and high-performance thermoplastic polymer B can be obtained with no thermal decomposition and no discoloration.

The industrial evaporation apparatus according to the present invention is particularly suitable for removing lower boiling point material by evaporation from a liquid having a relatively high viscosity. For example, it is particularly suitable for the case of using the industrial evaporation apparatus according to the present invention as a polymerization apparatus for a condensation polymer. In the case of using the conventional polymerization apparatuses, there have been places where some of the liquid resides while being heated for a prolonged period of time, whereupon this liquid undergoes degeneration such as discoloration, gelation, crosslinking, production of an ultra-high molecular weight polymer, solidification, scorching, carbonization or the like, and hence it is has been impossible to avoid the drawback of degenerated material mixing in the polymer progressively or suddenly. However, according to the industrial evaporation apparatus of the present invention, there are no such drawbacks, and moreover the industrial evaporation apparatus according to the present invention exhibits excellent effects not exhibited by the conventional polymerization apparatuses.

In other words, in the case, for example, of producing an aromatic polycarbonate by polymerizing a molten prepolymer obtained from an aromatic dihydroxy compound and a diaryl carbonate, the reaction temperature must generally be in a range of from 200 to 350° C., and the viscosity increases dramatically in the latter half of the polymerization in particular. An aromatic monohydroxy compound produced through an equilibrium reaction must be withdrawn from the ultra-high-viscosity material, and hence with the conventional polymerization apparatuses, for example even if a horizontal twin-shaft agitation type ultra-high-viscosity polymer reactor has been used, it has been necessary to carry out the reaction for a prolonged period of time at a high temperature of not less than 300° C. and under a high vacuum with a pressure of not more than 133 Pa, and moreover production of a high molecular weight material for sheets or the like has been difficult.

However, according to the polymerization apparatus of the present invention, efficient surface renewal occurs naturally accompanying internal stirring, and hence the polymerization reaction can be carried out at a relatively low temperature. A preferable reaction temperature is thus from 100 to 290° C., more preferably from 150 to 270° C. It is a characteristic feature of the polymerization apparatus according to the present invention that polymerization can be carried out adequately at a lower temperature than in the case of the conventional mechanically agitated polymerization apparatus, and this is also one reason why a high-quality aromatic polycarbonate can be produced with no discoloration or deterioration in properties. Furthermore, with the conventional polymerization apparatuses, there have been drawbacks such as contamination with foreign materials, and leaking in of air or the like through an agitator seal under a high vacuum. However, according to the polymerization apparatus of the present invention, because there is no mechanical agitation, there is no agitator seal, and hence there is very little leaking in of air or the like or contamination with foreign materials, which is another reason why a high-purity and high-performance aromatic polycarbonate can be produced. Such excellent effects are also achieved with other condensation polymers, in particular polyesters and polyamides. These excellent effects are particularly marked in the case of producing polyethylene terephthalate, polytrimethylene terephthalate, polybutylene terephthalate, nylon 6, or nylon 66.

In the case of producing a condensation polymer using the industrial evaporation apparatus according to the present invention, as the polymerization reaction proceeds, lower boiling point materials by-produced through an equilibrium reaction are removed from the reaction system, whereby the reaction rate can be increased. A method in which an inert gas that does not have an adverse effect on the reaction such as nitrogen, argon, helium, carbon dioxide or a lower hydrocarbon gas is introduced into the polymerization apparatus, and the lower boiling point materials are entrained by this gas and thus removed, a method in which the reaction is carried out under a reduced pressure, or the like is thus preferably used. Alternatively, a method in which these two methods are used together can also be preferably used. In such a case, there is no need to introduce a large amount of the inert gas into the polymerization apparatus, but rather just enough to maintain an inert gas atmosphere inside the apparatus is sufficient.

The reaction pressure in the case of producing a condensation polymer using the industrial evaporation apparatus according to the present invention varies depending on the types of lower boiling point material by-produced, the type and molecular weight of the polymer to be produced, the polymerization temperature, and so on, but in the case, for example, of producing an aromatic polycarbonate from a molten prepolymer produced from bisphenol A and diphenyl carbonate, in the case of a number average molecular weight of not more than 5,000, the reaction pressure is preferably in a range of from 400 to 3,000 Pa, and in the case of a number average molecular weight of from 5,000 to 10,000, the reaction pressure is preferably in a range of from 50 to 500 Pa. In the case of a number average molecular weight equal to or greater than 10,000, the reaction pressure is preferably not more than 300 Pa, particularly preferably in a range of from 20 to 250 Pa.

In the case of producing a condensation polymer using the industrial evaporation apparatus according to the present invention as a polymerization apparatus, a polymer having the desired polymerization degree can be produced using only one such evaporation apparatus, but depending on the polymerization degree of the monomer melt or molten prepolymer used as the starting material, the amount produced of the polymer, and so on, a system in which a plurality of such evaporation apparatuses are linked together so that the polymerization degree is progressively increased may be preferable. In this case, guides and reaction conditions suitable for the polymerization degree of the prepolymer or polymer to be produced are preferably adopted for each of the evaporation apparatuses individually. For example, in the case of a system in which a first guide-contacting downflow type polymerization apparatus, a second guide-contacting downflow type polymerization apparatus, a third guide-contacting downflow type polymerization apparatus, a fourth guide-contacting downflow type polymerization apparatus and so on are used so that the polymerization degree is progressively increased, taking the total external surface areas of the guides possessed by the polymerization apparatuses to be S1, S2, S3, S4 . . . respectively, the system can be made to be such that S1≧S2≧S3≧S4≧ . . . . Moreover, the polymerization temperature may be the same in each of the polymerization apparatuses, or alternatively may be progressively increased. The polymerization pressure may also be progressively reduced in the polymerization apparatuses.

In this sense, in the case, for example, of progressively increasing the polymerization degree using two polymerization apparatuses, i.e. a first guide-contacting downflow type polymerization apparatus and a second guide-contacting downflow type polymerization apparatus, it is preferable to use guides such that the total external surface area S1 (m$^2$) of the guides in the first polymerization apparatus and the total external surface area S2 (m$^2$) of the guides in the second polymerization apparatus satisfy the following formula (13):

$$1 \leq S1/S2 \leq 20 \qquad (13).$$

If S1/S2 is less than 1, then problems arise such as variation in the molecular weight increasing so that prolonged stable production becomes difficult, and it becoming difficult to obtain a prescribed production amount, whereas if S1/S2 is greater than 20, then the flow rate of the molten prepolymer flowing down the guides in the second polymerization apparatus becomes high, and as result problems arise such as the residence time of the molten prepolymer becoming short so that it becomes difficult to obtain a polymer of the required molecular weight. For such reasons, a more preferable range is $1.5 \leq S1/S2 \leq 15$.

According to the industrial evaporation apparatus or polymerization equipment of the present invention, not less than 1 ton/hr of a concentrated liquid or polymer can easily be produced. In the case of producing a condensation polymer from a monomer melt or a molten prepolymer, the polymerization is carried out through an ordinary polymerization reaction while discharging by-produced lower boiling point materials out of the system, and hence it is necessary for the monomer melt or molten prepolymer used as the starting material to be fed into the polymerization apparatus or equipment in an amount greater than 1 ton/hr. The amount of the monomer melt or molten prepolymer constituting the liquid fed into the evaporation apparatus thus varies depending on the polymerization degree thereof and the polymerization degree of the polymer to be produced, but is generally from 10 to 500 kg/hr greater than the amount of the polymer produced per 1 ton/hr of the polymer produced, i.e. in a range of from 1.01 to 1.5 ton/hr per 1 ton/hr of the polymer produced. Moreover, in the case of carrying out concentration through evaporation or purification through evaporation on a thermoplastic polymer or liquid containing lower boiling point material, the amount of the liquid fed in varies depending on the lower boiling point material content and the required concentration degree or purification degree, but is generally in a range of from 1.001 to 100 ton/hr, preferably from 1.005 to 50 ton/hr, more preferably from 1.01 to 20 ton/hr.

So long as the industrial evaporation apparatus according to the present invention satisfies the conditions described in the claims, and moreover has a correspondingly suitable mechanical strength, the industrial evaporation apparatus may be of any type, and may have adjoined thereto equipment having some other function required for continuous operation. Moreover, according to the industrial evaporation apparatus of the present invention, a plurality of such industrial evaporation apparatuses may be joined together, and furthermore equipment having some function other than evaporation may be adjoined thereto.

EXAMPLES

Next, the present invention will be described in more detail with reference to Examples and Reference Examples.

Example 1

Figure 2:
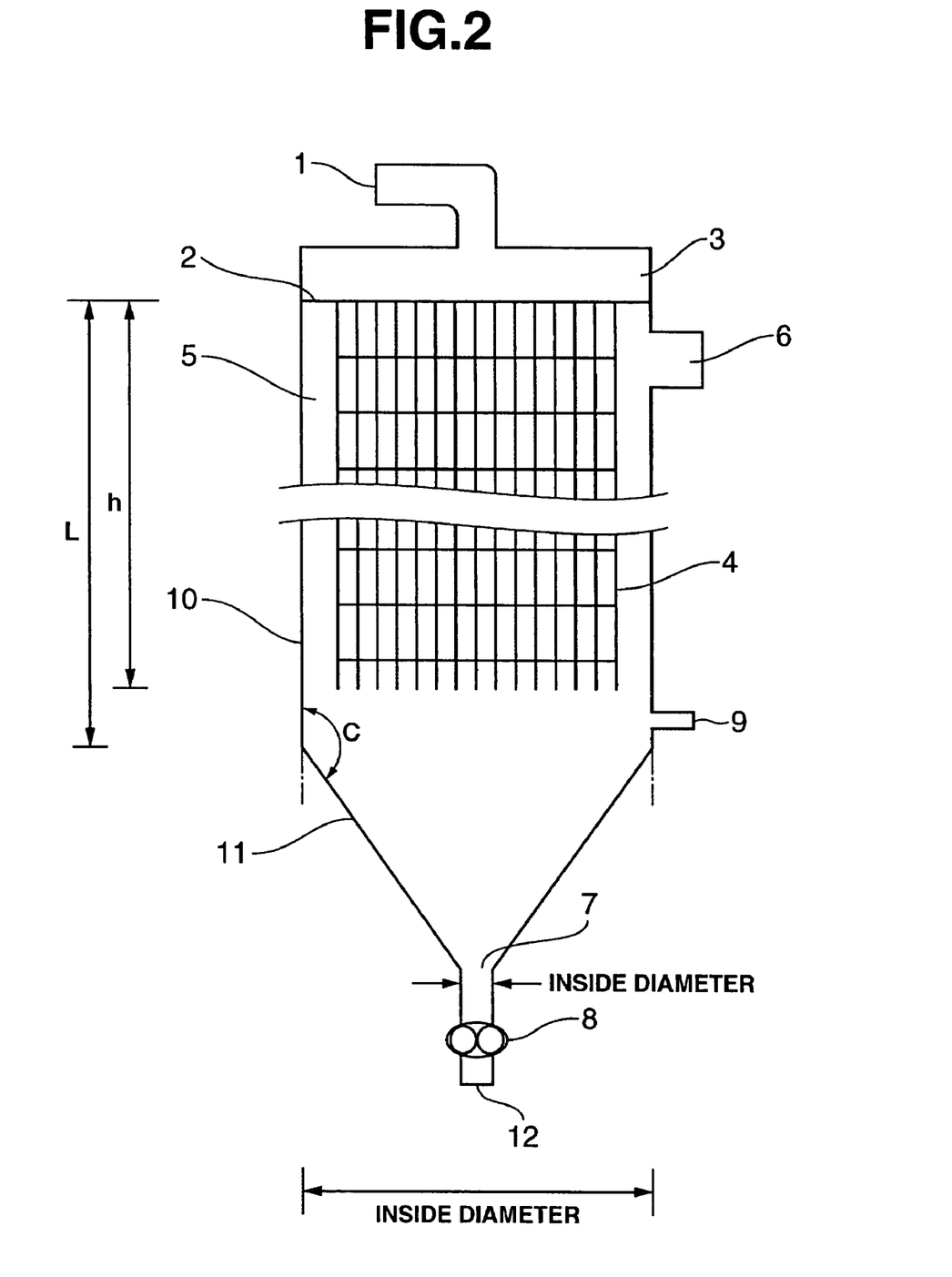
FIG. 2 is a schematic sectional view showing a cylindrical industrial evaporation apparatus according to the present invention.
Figure 3:
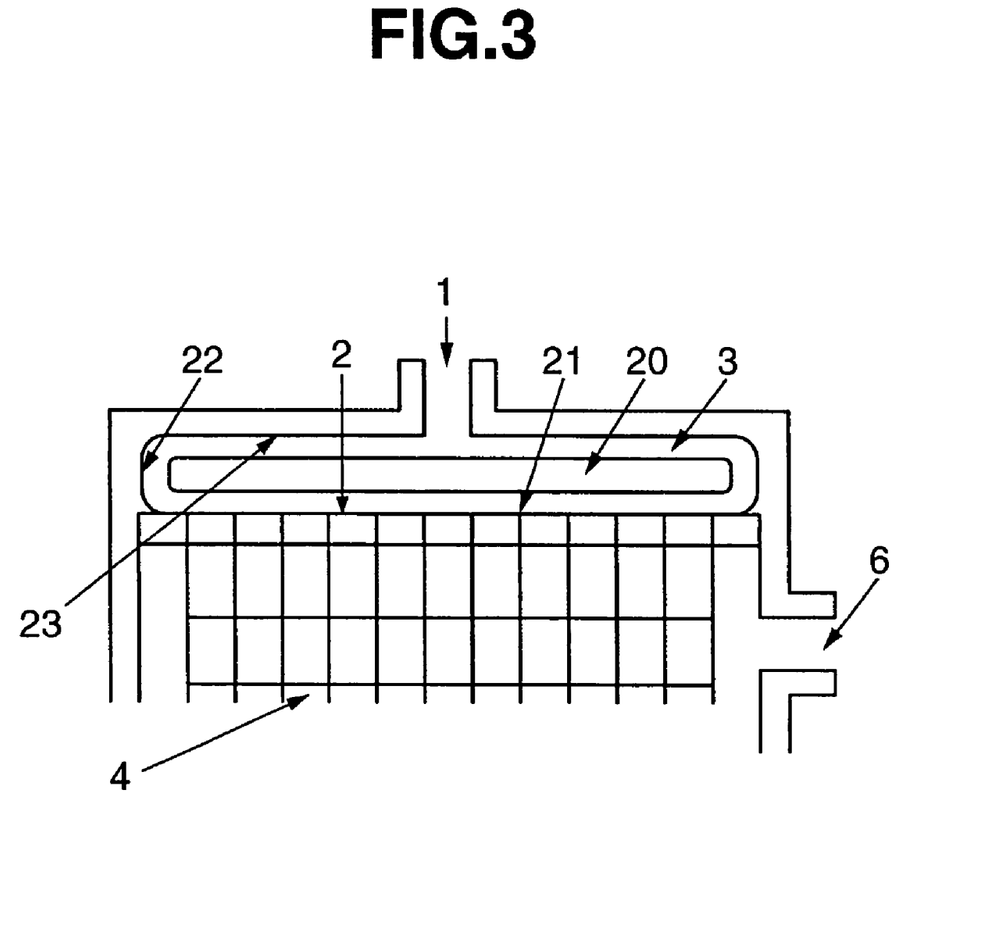
FIG. 3 is a sectional view showing schematically an upper portion of the industrial evaporation apparatus according to the present invention.
Figure 4:
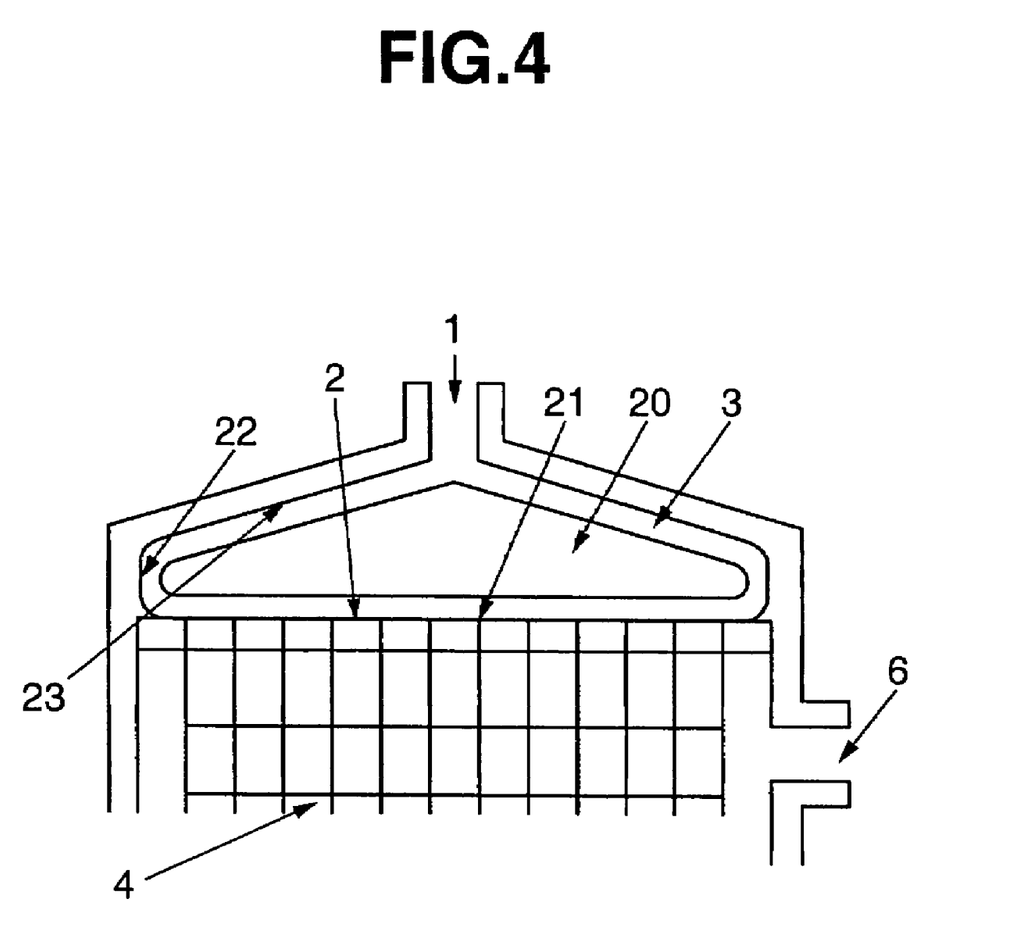
FIG. 4 is a sectional view showing schematically an upper portion of the industrial evaporation apparatus of the present invention.
Figure 5:
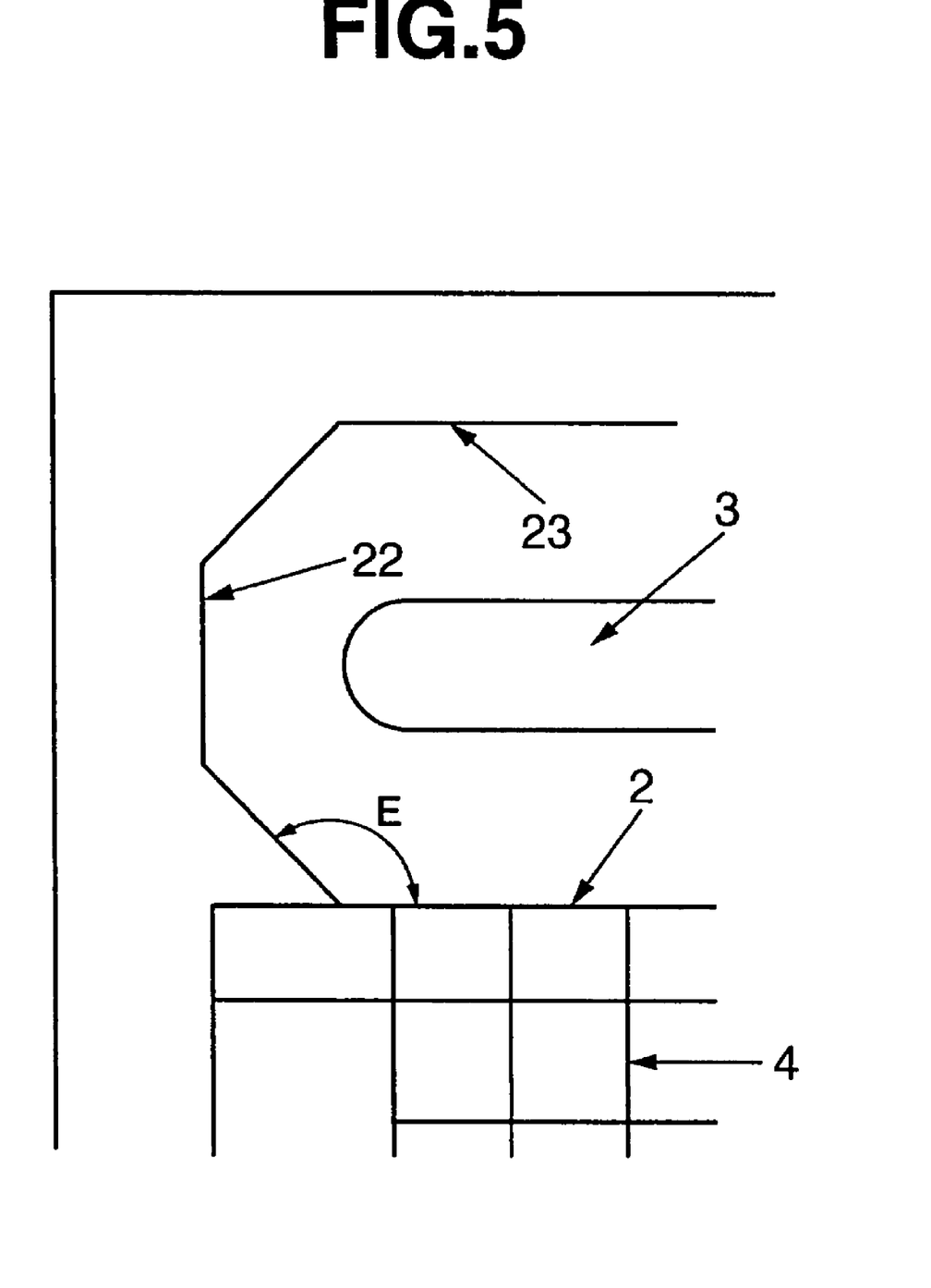
FIG. 5 is a sectional view showing schematically means for eliminating "dead space" between an internal wall of a liquid feeding zone, and a perforated plate and a flow path controlling member.
Figure 6:
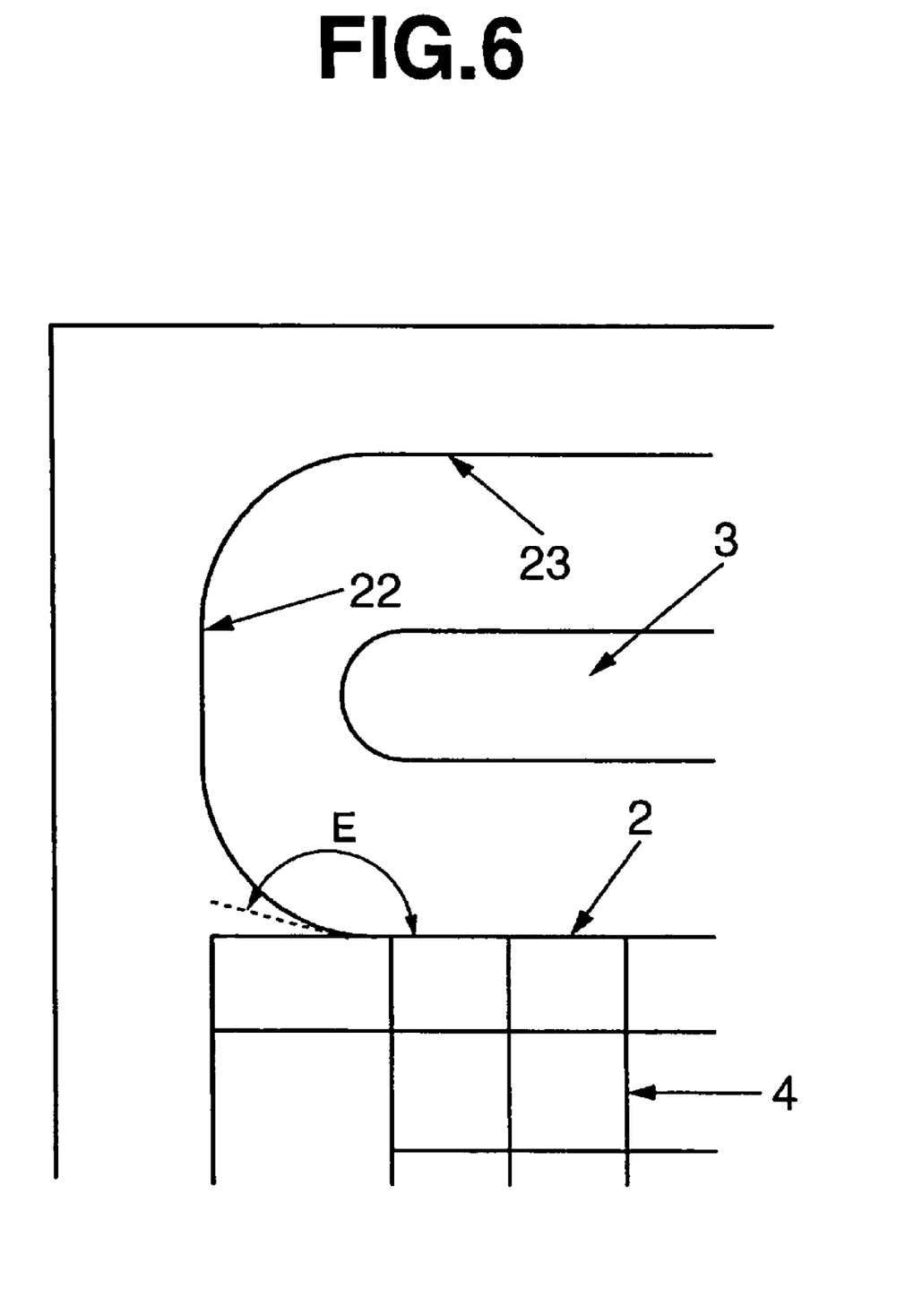
FIG. 6 is a sectional view showing schematically means for eliminating "dead space" between an internal wall of the liquid feeding zone, and a perforated plate and the flow path controlling member.

An industrial evaporation apparatus having a disk-shaped flow path controlling member 20 of thickness approximately 2 cm and guides 4 as shown in FIGS. 2 and 3. The disk-shaped flow path controlling member 20 was fixed suspended from the top thereof such that the spacing from the top internal wall 23 of the liquid feeding zone 3 was approximately 8 cm. Moreover, the spacing between the internal sidewall surface 22 of the liquid feeding zone 3 and the flow path controlling member 20 was approximately 9 cm, and the spacing between the perforated plate 2 and the flow path controlling member 20 was approximately 8 cm. Note that a peripheral portion of the disk-shaped flow path controlling member 20 was designed such that the vertical section thereof was a semicircle of radius approximately 1 cm, and was thus devised such that the liquid would not stagnate around this peripheral portion. Moreover, the section of the joint between the internal sidewall surface 22 of the liquid feeding zone 3 and the perforated plate 2 was designed to be concave on the inside as shown in FIG. 6, and an angle E for the rising portion was approximately 170°. The material of the evaporation apparatus was all stainless steel. The discharging pump 8 is preferably a gear pump in the case that the concentrated liquid is of high viscosity, and is an ordinary liquid-feeding pump in the case that the viscosity is not so high. The industrial evaporation apparatus had a cylindrical side-wall casing 10 and a conical bottom-wall casing 11, and was such that L=1,000 cm, h=900 cm, D=500 cm, d=40 cm, C=155°, S=250 m$^2$, A=19.625 m$^2$, A/B=156.25, D/d=12.5, L/D=2, and r=0.3 cm. All of the formulae (1) to (12) were satisfied. Care was taken such that, in the liquid feeding zone 3, the liquid containing lower boiling point materials fed in from the liquid receiving port 1 passes between the upper surface of the flow path controlling member 20 and the top internal wall 23 of the liquid feeding zone 3, and between the internal sidewall surface 22 of the liquid feeding zone 3 and the flow path controlling member 20, and is then distributed uniformly from the holes (e.g. 21) in the perforated plate 2 to the guides 4 while flowing mainly from the peripheral portion toward the central portion of the perforated plate 2. An inert gas feeding port 9 was provided in a lower portion of the evaporation apparatus, and an evaporated material outlet 6 (generally connected to a gas condenser and a pressure-reducing apparatus) for the lower boiling point materials was provided in an upper portion of the evaporation apparatus. A jacket or a heating tube for a heating medium was provided on the outside of the evaporation apparatus, so that the evaporation apparatus could be maintained at a prescribed temperature using the heating medium.

Reference Example 1

Using the industrial evaporation apparatus of Example 1 as a polymerization apparatus for a condensation polymer, an aromatic polycarbonate was produced. A molten prepolymer (number average molecular weight Mn=4,000) for the aromatic polycarbonate that had been produced from bisphenol A and diphenyl carbonate (molar ratio of diphenyl carbonate to bisphenol A=1.05) and was held at 260° C. was continuously fed into the liquid feeding zone 3 from the liquid receiving port 1 by a feed pump. The molten prepolymer, which was continuously fed into the evaporation zone 5 (polymerization reaction zone) from the holes in the perforated plate 2 while flowing from the peripheral portion toward the central portion of the perforated plate 2, was subjected to polymerization while flowing down along the guides 4. The polymerization reaction zone was held at 80 Pa via a vacuum vent 6. Produced aromatic polycarbonate entering into the bottom portion 11 of the polymerization apparatus from the bottom of the guides 4 was continuously withdrawn at a flow rate of 5.5 ton/hr from the discharge port 7 by the discharging pump 8 such that the amount of the aromatic polycarbonate in the bottom portion 11 was constant.

The number average molecular weight Mn of the aromatic polycarbonate withdrawn from an outlet 12 after 50 hours from commencement of operation was 10,500, and the aromatic polycarbonate had a good color (b*=3.2). Moreover, the tensile elongation was 98%. The values of Mn for the aromatic polycarbonate withdrawn from the outlet 12 after 60 hours, 100 hours, 500 hours, 1,000 hours, 2,000 hours, 3,000 hours, 4,000 hours, and 5,000 hours from commencement of operation were 10,500, 10,550, 10,500, 10,550, 10,500, 10,500, 10,550, and 10,500 respectively, and hence operation was stable.

The aromatic polycarbonate produced as above had a content of alkali metal and/or alkaline earth metal compounds of 0.04 to 0.05 ppm in terms of the metallic elements, which was used as the catalyst.

Example 2

Polymerization equipment for a condensation polymerization type polymer in which two industrial evaporation apparatuses each having a flow path controlling member 20 and guides 4 as shown in FIGS. 2 and 3 are arranged in series. An aromatic polycarbonate was produced using this polymerization equipment (first polymerization apparatus plus second polymerization apparatus). The material of the evaporation apparatuses was all stainless steel. The discharging pump 8 for each of the evaporation apparatuses was a gear pump. The first polymerization apparatus, which was of a guide-contacting downflow type, had a cylindrical side-wall casing 10 and a conical bottom-wall casing 11, and was such that L=950 cm, h=850 cm, D=400 cm, d=20 cm, C=150°, S=750 m$^2$, A=12.56 m$^2$, A/B=400, D/d=20, L/D=2.375, and r=0.3 cm. Note that the diameter of the cross section of the flow path controlling member 20 was a little small, but this cross section had the same shape as in Example 1, and the spacings between the flow path controlling member 20 and the wall surfaces (23 and 22) of the liquid feeding zone 3 and the spacing between the flow path controlling member 20 and the perforated plate 2 were as in Example 1. Moreover, as in Example 1, the section of the joint between the internal sidewall surface 22 of the liquid feeding zone 3 and the perforated plate 2 was designed to be concave on the inside as shown in FIG. 6, and an angle E for the rising portion was approximately 170°. The above values satisfy all of the formulae (1) to (12). Moreover, the second polymerization apparatus was the same as the polymerization apparatus of Example 1.

Reference Example 2

A molten prepolymer (number average molecular weight Mn=2,500) for an aromatic polycarbonate that had been produced from bisphenol A and diphenyl carbonate (molar ratio of diphenyl carbonate to bisphenol A=1.06) and was held at 265° C. was continuously fed into the liquid feeding zone 3 from the liquid receiving port 1 of the first polymerization apparatus by a feed pump. The molten prepolymer, which was continuously fed into the polymerization reaction zone via the perforated plate 2 in the first polymerization apparatus, was subjected to polymerization while flowing down along the guides 4. The polymerization reaction zone of the first polymerization apparatus was held at a pressure of 800 Pa via a vacuum vent 6. Aromatic polycarbonate molten prepolymer of increased polymerization degree (number average molecular weight Mn=5,500) entering the bottom portion 11 of the polymerization apparatus from the bottom of the guides 4 was continuously withdrawn at a constant flow rate from the discharge port 7 by the discharging pump 8 such that the amount of the aromatic polycarbonate molten prepolymer in the bottom portion 11 was constant. This molten prepolymer was continuously fed into the liquid feeding zone 3 from the liquid receiving port 1 of the second polymerization apparatus by a feed pump. The molten prepolymer, which was continuously fed into the polymerization reaction zone via the perforated plate 2 in the second polymerization apparatus, was subjected to polymerization while flowing down along the guides 4. The polymerization reaction zone of the second polymerization apparatus was held at a pressure of 50 Pa via a vacuum vent 6. Produced aromatic polycarbonate entering the bottom portion 11 of the second polymerization apparatus from the bottom of the guides 4 was continuously withdrawn at a flow rate of 6 ton/hr from the discharge port 7 by the discharging pump 8 such that the amount of the aromatic polycarbonate in the bottom portion 11 was constant.

The number average molecular weight Mn of the aromatic polycarbonate withdrawn from an outlet 12 of the second polymerization apparatus after 50 hours from commencement of operation was 11,500, and the aromatic polycarbonate had a good color (b*=3.2). Moreover, the tensile elongation was 99%. The values of Mn for the aromatic polycarbonate withdrawn from the outlet 12 after 60 hours, 100 hours, 500 hours, 1,000 hours, 2,000 hours, 3,000 hours, 4,000 hours, and 5,000 hours from commencement of operation were 11,500, 11,550, 11,500, 11,550, 11,500, 11,500, 11,550, and 11,500 respectively, and hence operation was stable.

The aromatic polycarbonate produced as above had a content of alkali metal and/or alkaline earth metal compounds of 0.03 to 0.05 ppm in terms of the metallic elements, which was used as the catalyst.

INDUSTRIAL APPLICABILITY

The evaporation apparatus according to the present invention is preferably used as an industrial evaporation apparatus suitable for efficiently concentrating a large amount of a liquid containing material having a lower boiling point than that of the liquid, without drawbacks such as discoloration, contamination with foreign material, or deterioration in properties. It is particularly preferable to use the evaporation apparatus according to the present invention in the case that the liquid has a relatively high viscosity. Particularly preferable applications of the industrial evaporation apparatus according to the present invention are as a condensation polymer polymerization apparatus, a purifying apparatus for a thermoplastic polymer melt, or an apparatus for separating and thus recovering the polymer from a thermoplastic polymer solution and purifying the polymer.

We claim:

1. An industrial evaporation apparatus in which a liquid containing a material having a lower boiling point than that of said liquid is made to flow down along an external surface of a guide that does not themselves have a heat source, during which time said lower boiling point material is evaporated, wherein improvement comprises:

(1) said evaporation apparatus comprising a liquid receiving port; a liquid feeding zone for feeding said liquid via a perforated plate to said guide provided in an evaporation zone; said evaporation zone having a plurality of guides that extend downward within a space enclosed by said perforated plate, a side-wall casing, and a bottom-wall casing; an evaporated material outlet provided in said evaporation zone; and a liquid discharge port provided in a lowermost portion of the bottom-wall casing;

(2) a flow path controlling member which has a function of making said liquid fed onto the perforated plate from said liquid receiving port flow mainly from a peripheral portion toward a middle portion of the perforated plate being provided in said liquid feeding zone;

(3) an internal sectional area A (m²) taken through a horizontal plane of the side-wall casing of said evaporation zone satisfying the following formula (1):

$$0.7 \leq A \leq 300 \tag{1}$$

(4) a ratio between said A (m²) and an internal sectional area B (m²) taken through a horizontal plane of the liquid discharge port satisfying the following formula (2):

$$20 \leq A/B \leq 1000 \tag{2}$$

(5) the bottom-wall casing constituting the bottom portion of said evaporation zone being connected at an internal angle C (°) to said side-wall casing on said bottom-wall casing, wherein said angle C (°) satisfies the following formula (3):

$$110 \leq C \leq 165 \tag{3}$$

(6) a length h (cm) of each of said guides satisfying the following formula (4):

$$150 \leq h \leq 5000 \tag{4}$$

(7) a total external surface area S (m²) of said guides satisfying the following formula (5):

$$2 \leq S \leq 50000 \tag{5}$$

2. The industrial evaporation apparatus according to claim 1, wherein not less than 1 ton/hr of said liquid is subjected to the evaporation.

3. The industrial evaporation apparatus according to claim 1 or 2, wherein an angle E (°) between an internal sidewall surface of said liquid feeding zone and said perforated plate satisfies the following formula (6):

$$100 \leq E < 180 \tag{6}$$

4. The industrial evaporation apparatus according to claim 1, wherein said side-wall casing of said evaporation zone is cylindrical with an inside diameter D (cm) and a length L (cm), the bottom-wall casing connected at a bottom portion of said side-wall casing is conical, and the liquid discharge port, which is in the lowermost portion of the conical bottom-wall casing, is cylindrical with an inside diameter d (cm), wherein D, L and d satisfy the following formula (7), (8), (9) and (10):

$$100 \leq D \leq 1800 \tag{7}$$

$$5 \leq D/d \leq 50 \tag{8}$$

$$0.5 \leq L/D \leq 30 \tag{9}$$

$$h-20 \leq L \leq h+300 \tag{10}$$

5. The industrial evaporation apparatus according to claim 1, wherein the h satisfies the following formula (11):

$$400 < h \leq 2500 \tag{11}$$

6. The industrial evaporation apparatus according to claim 1, wherein one of said guides is cylindrical, or pipe-shaped and made to be such that the liquid and/or gaseous material cannot enter therein, with an outside diameter r (cm), wherein r satisfies the following formula (12):

$$0.1 \leq r \leq 1 \tag{12}$$

7. The industrial evaporation apparatus according to claim 1, wherein said guides comprise guides wherein one of said guides is cylindrical, or pipe-shaped and made to be such that the liquid and/or gaseous material cannot enter therein, with an outside diameter r (cm), wherein r satisfies the following formula (12):

$$0.1 \leq r \leq 1 \quad (12),$$

and
the guides are joined together by transverse supports.

8. The industrial evaporation apparatus according to claim 1, wherein said guides comprise guides
wherein one of said guides is cylindrical, or pipe-shaped and made to be such that the liquid and/or gaseous material cannot enter therein, with an outside diameter r (cm), wherein r satisfies the following formula (12):

$$0.1 \leq r \leq 1 \quad (12),$$

and
from one of a grid-based or mesh-based guide structure in which the guides are fixed together by transverse supports, a three-dimensional guide structure in which a plurality of grid-based or mesh-based guide structures are arranged in front of and behind one another and are fixed together by transverse supports, and a jungle-gym-based three-dimensional guide structure in which the guides are fixed together in front of and behind, and left and right of, one another by transverse supports.

9. The industrial evaporation apparatus according to claim 1, wherein said liquid is a melt of a monomer or a mixture of two or more kinds of monomers for producing a condensation polymer, and/or a prepolymer of the condensation polymer, and/or the condensation polymer, the lower boiling point material is a by-produced material and/or oligomer produced through condensation polymerization, and said industrial evaporation apparatus is a condensation polymer polymerization apparatus for removing said lower boiling point material from said melt by evaporation so as to increase a polymerization degree of the prepolymer of the condensation polymer and/or the condensation polymer.

10. The industrial evaporation apparatus according to claim 9, wherein the condensation polymer is a polyester, a polyamide, or a polycarbonate.

11. The industrial evaporation apparatus according to claim 1, wherein said liquid is a melt of a thermoplastic polymer A, said lower boiling point material is a monomer, an oligomer, and a by-produced material contained in the polymer, and the industrial evaporation apparatus is a purifying apparatus for removing said lower boiling point material from said melt by evaporation so as to increase purity of said thermoplastic polymer A.

12. The industrial evaporation apparatus according to claim 11, wherein said thermoplastic polymer A is a polystyrene-based polymer, a polyvinyl chloride-based polymer, a polyvinylidene chloride-based polymer, a polyacrylonitrile-based polymer, a polyacrylic ester-basedpolymer, a polymethacrylic ester-based polymer, or a thermoplastic elastomer.

13. The industrial evaporation apparatus according to claim 1, wherein said liquid is a solution of a thermoplastic polymer B, said lower boiling point material is a solvent in which said thermoplastic polymer is dissolved and/or a monomer, an oligomer, and a by-produced material contained in said polymer solution, and said industrial evaporation apparatus is a separation recovery/purification apparatus for removing said low boiling point material from said solution by evaporation so as to separate and thus recover said thermoplastic polymer from said solution and increase purity of said thermoplastic polymer.

\* \* \* \* \*